United States Patent [19]

Michie, Jr.

[11] 4,374,227

[45] Feb. 15, 1983

[54] EXTRUDED GLOSS IMPROVEMENT IN PIPE BLENDS WITH LOW PRESSURE LOW DENSITY POLYETHYLENE

[75] Inventor: William J. Michie, Jr., Raritan, N.J.

[73] Assignee: Union Carbide Corporation, Danbury, Conn.

[21] Appl. No.: 263,887

[22] Filed: May 15, 1981

[51] Int. Cl.$^3$ ............................................... C08K 3/04
[52] U.S. Cl. .................................... 524/528; 525/240
[58] Field of Search ..................... 260/42.46; 525/240; 524/828

[56] References Cited

U.S. PATENT DOCUMENTS

| | | | |
|---|---|---|---|
| 3,125,548 | 3/1964 | Anderson | 525/240 |
| 3,176,051 | 3/1965 | Gregorian et al. | 525/240 |
| 3,179,720 | 4/1965 | Hillmer | 525/240 |
| 3,418,270 | 12/1968 | Traub | 260/42.46 |
| 3,914,342 | 10/1975 | Mitchell | 525/240 |
| 3,963,647 | 6/1976 | Straub | 260/42.46 |
| 3,998,914 | 12/1976 | Lillis et al. | 525/240 |
| 4,011,382 | 3/1979 | Levine et al. | 526/96 |

FOREIGN PATENT DOCUMENTS 4645 10/1979 European Pat. Off.
4647 10/1977 European Pat. Off.

OTHER PUBLICATIONS

Derwent Abst. 84112A/47 Raychem Corp., 11-20-75, (BE-867236).
Derwent Abst. 25952D/15 CIE Gen. Elec., (2-20-81), FR 2459815.
Derwent Abst. 22257/B/12 BASF, (3-15-79) (DT2741005), "Polyethylene Tubes . . . ".

Primary Examiner—Paul Lieberman
Assistant Examiner—Herbert J. Lilling
Attorney, Agent, or Firm—John A. Shedden

[57] ABSTRACT

Medium density polyethylene pipe blends with improved low temperature brittleness properties and pipe made therefrom with enhanced gloss composed of
  a high density ethylene polymer;
  a low pressure, low density alkylene interpolymer; and
  a carbon black concentrate wherein the carrier in said concentrate is a low pressure, low density alkylene interpolymer.

22 Claims, No Drawings

EXTRUDED GLOSS IMPROVEMENT IN PIPE BLENDS WITH LOW PRESSURE LOW DENSITY POLYETHYLENE

BACKGROUND OF THE INVENTION

1. Field of the Invention

The invention relates to low pressure, low density alkylene interpolymers in carbon black concentrates to be used in blends of thermoplastic ethylene polymers from which medium density grades of pipe may be formed.

2. Description of the Prior Art

Plastic pipe made from thermoplastic ethylene polymers is usually characterized, in terms of the nominal density of the resin from which the pipe is formed, as being a low, medium or high density grade. The low density material has a density of about 0.910 to 0.925 grams per cubic centimeter, the medium density material has a density of about 0.926 to 0.940 grams per cubic centimeter, and the high density material has a density equal to or greater than 0.941 to about 0.959 grams per cubic centimeter.

The manufacture of medium density pipe making compounds has usually been accomplished by blending low density resin with high density resin so as to be able to provide a wider range of physical properties with the resulting blend of resins than historically could be easily provided by the use of individual medium density resins.

Natural ethylene polymers have a detrimental property in that they slowly degrade in air (oxygen) which degradation is accelerated by the presence of heat and/or ultraviolet radiation. Photo- and thermal-oxidation stabilization can be achieved by the addition of carbon black. In addition to their function as a light screen, carbon black particles may act as radical traps.

The use of carbon black, however, poses problems of dispersion, for in order that it be effective in inhibiting degradation of physical and chemical properties of ethylene polymers due to weathering, it must be uniformly distributed throughout the polymeric matrix. The effectiveness of carbon black as an inhibitor is directly proportional to the number of the dispersed carbon black particles and the uniformity of their distribution and inversely proportional to the size of the individual particles of carbon black in the matrix. But the finer the particles of carbon black, the greater the tendency to form mechanical aggregates of particles or "agglomerates". These agglomerates cause the final product to exhibit a reduced resistance to degradation, uneven pigmentation, and poor surface characteristics, e.g. roughness and lack of gloss. In addition, the presence of agglomerates on the surface creates processing difficulties. The net result of these agglomerates is an unsatisfactory product.

Heretofore, methods of introducing carbon black into ethylene polymers have been unable to produce pipe that meets the increasingly critical desires of the piping industry for improved gloss. A commonly used method involves sprinkling the desired amount of carbon black, as a powder, on the ethylene polymer composition while it is fluxed under conditions of high sheer on a differential two-roll mill until a mixture of the carbon black in the polymer is obtained. This method is slow and, therefore costly and cannot consistently produce large quantities of uniformly pigmented ethylene polymer which is substantially free of agglomerates. In addition, the problem of dusting inherent in this method is not only injurious to health but creates both fire and explosion hazards.

The above-described technique is adaptable to production of a highly concentrated mixture or masterbatch of carbon black and ethylene polymer. Unpigmented or natural ethylene polymer is added to this masterbatch in a later step to reduce the concentration of carbon black to that desired for the final product. Products made in this way show a definite increase in quality over those produced without the concentrate addition step.

During the production of extruded pipe, resin exits a die in tubular form and is drawn through the interior of a brass sizing sleeve which polishes the exterior surface of the extruded polymer pipe. As a result of the carbon black concentrate addition to the pipe blends, the interior, freely extruded surface of the ethylene polymer pipe always realized gloss characteristics significantly below and roughness characteristics significantly higher than that achieved on the exterior, polished surface of the extruded pipe.

Despite the versatility of being able to easily provide a wide range of extrudable medium density ethylene pipe making compounds by blending low density resin with high density resin, it has not been readily possible prior to the present invention, to provide an extrudable medium density pipe making composition from ethylene polymers to which a carbon black concentrate has been added which is entirely suitable for making extruded medium density pipe therefrom under present day high speed (10 to 100 feet per minute, 100–1,000 lbs. per hour at temperatures of greater or equal to 200° C. and at pressures of greater or equal to 500 psi) pipe extrusion conditions and wherein the resulting pipe would have a high gloss, satin-like finish on the inside or freely extruded surface of the pipe concommitant with a notched low temperature embrittlement point of less than −65° C. in the composition. Of course, smooth and glossy surfaces are important not only from an esthetic viewpoint but also for fluid flow considerations.

Commercially acceptable grades of carbon black filled medium density potable water pipe must meet the following criteria: ASTM pipe specifications in accordance with the PE-2306 classification.

SUMMARY OF THE INVENTION

An object of the present invention is to provide a medium density, carbon black filled, thermoplastic ethylene polymer based composition that can be readily extrudable into pipe.

Another object of the present invention is to provide an improved carbon black concentrate which can be added to a medium density, thermoplastic, ethylene polymer based composition with improved notched low temperature brittleness properties from which extruded pipe having enhanced smoothness and gloss may be prepared.

These and other objects of the present invention are achieved with a thermoplastic composition formed from a selective combination of ethylene polymers with an alkylene interpolymer, carbon black concentrate.

DESCRIPTION OF THE PREFERRED EMBODIMENT

The objects of the present invention are achieved by employing as an extrudable, pipe forming composition one having the following formulation, based on a total weight percent therein of 100;

(a) about 40 to about 80, and preferably about 55 to about 70 weight percent of a thermoplastic high density ethylene polymer;

(b) about 10 to 50, and preferably about 20 to 40 weight percent of a thermoplastic low density alkylene interpolymer preferably an ethylene copolymer made by a low pressure process; and (c) about 5.5 to about 9.5 weight percent of a carbon black concentrate.

The essence of the invention lies in the fact that the concentrate has about 25 to about 45 parts by weight based on the weight of the total composition of the concentrate of carbon black and from about 55 to about 75 parts by weight of a second low density alkylene interpolymer which has been prepared by a low pressure process.

To produce the medium density pipe resins i.e. those with a nominal density of from about 0.926 to about 0.940 grams per cubic centimeter, the art previously blended high density ethylene polymer, that is ethylene polymers having densities equal to or greater than 0.941 to about 0.959 grams per cubic centimeter with low density ethylene interpolymers produced by a high pressure process. By high pressure, low density ethylene polymer is meant one that is usually produced at about 300° C. in a tubular reactor operating at from about 30,000 to 50,000 psi utilizing air and/or peroxide catalysts.

Recently, the high density resins have been blended with ethylene interpolymers which have been produced at about 100° C. under low pressure, i.e., from about 100 to about 300 psi conditions in a gas phase reactor. These alkylene interpolymers are usually prepared using organo-metallic catalysts. As a general comparison of their molecular structures, the high density ethylene polymers contain relatively few side chains with little or no long chain branching. The high pressure, low density polyethylene polymers contain many heterogeneous side chain branches—some branches exceedingly long—whereas the low pressure, low density alkylene interpolymers possess many homogeneous, short side chain branches and are therefore essentially linear. Even though the low pressure, low density alkylene interpolymers are more difficult to process relative to the high pressure, low density resins, they do possess improved properties such as higher melting points, tensile strengths, stiffness, impact strengths, stress crack resistance and burst strengths and so have been recently used as the first low density resin being blended with a high density ethylene polymer to prepare the medium density pipe formulations as exemplified in commonly assigned, Canadian Pat. No. 1,106,521, issued Aug. 4, 1981.

By nominal density is meant the density of the base resin blend in the uncolored or unfilled state, e.g. without the carbon black concentrate addition.

For ease of processability, the art has utilized low density ethylene polymer prepared via a high pressure process as the carrier and dispersion resin for the carbon black in the carbon black concentrate additive. To distinguish this low density concentrate resin from the low density resin of the original blend, the concentrate resin will be identified as the "second".

This invention is drawn to the fact that when low density alkylene interpolymers produced by a low pressure process are used in the carbon black concentrate, the smoothness of the surface of the interior of the pipe, i.e., the freely extruded surface, is significantly increased and the gloss noticeably enhanced. Furthermore, low temperature brittleness properties of the pipe composition are greatly improved.

The pipe forming compositions of the present invention are used in the thermoplastic form, that is, they are not cross-linked.

HIGH DENSITY ETHYLENE POLYMER

The high density ethylene polymer which is used in the composition of the present invention is a normally solid i.e. solid at 23° C. thermoplastic resin having a density of equal to or greater than 0.941 to about 0.959 grams per cubic centimeter and preferably about 0.948 to 0.952 grams per cubic centimeter.

The resin has a melt index of from about 0.10 to 2.0 decigrams per minute and preferably of about 0.7 to 1.3 decigrams per minute.

The high density polyethylene can contain $C_2$ to $C_6$ interpolymerized mono-alpha-olefins such as polypropylene, butene-1 and hexene-1.

The high density ethylene polymers may be used individually or in combination with each other in the compositions of the present invention.

The high density ethylene polymers have a cyclohexane extractables (24 hours, at reflux temperatures at atmospheric pressure) content of 1 to about 20 weight percent.

The high density ethylene polymers may be made under low pressure conditions of about 150 to 300 psi with supported chromium compound based catalysts such as chromium oxide (as disclosed in U.S. Pat. No. 2,825,721);

silyl chromate (as disclosed in U.S. Pat. No. 3,023,203); and bis(cyclopentadiene) chromium (as disclosed in U.S. Pat. No. 3,687,920 or U.S. Pat. No. 3,709,853).

The disclosures of these patents are incorporated herein by reference.

LOW PRESSURE LOW DENSITY ETHYLENE INTERPOLYMER

The low pressure, low density ethylene interpolymer which is to be used in the compositions of the present invention is a normally solid i.e. solid at 23° C. thermoplastic resin having a density of about 0.910 to 0.925 grams per cubic centimeter and preferably about 0.918 to 0.922 grams per cubic centimeter, and a melt index of about 0.10 to 2.0 decigrams per minute and preferably of about 0.50 to 0.90 decigrams per minute.

The low density alkylene interpolymers include homopolymers of the olefins, as well as interpolymers of one or more olefins with each other, and/or up to about 30 weight percent of one or more monomers which are copolymerizable with such olefins. The olefins can be ethylene, propylene, butene-1, isobutylene, pentene-1, 4-methyl-pentene-1, hexene-1, octene-1, nonene-1, decene-1, as well as interpolymers of one or more of such olefins and one or more other monomers which are interpolymerizable with such olefins, such as other vinyl and diene compounds, i.e., those having the group

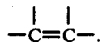

Preferred copolymers are the ethylene copolymers such as ethylene/propylene copolymers, ethylene/butene-1 copolymers, ethylene/pentene-1 copolymers, ethylene/4-methyl-pentene-1 copolymers, ethylene/hexene-1 copolymers, ethylene/octene-1 copolymers, and the like. Preferred ethylene interpolymers would include two or more of the following: propylene, butene-1, isobutylene, pentene-1, hexene-1, 4-methyl-pentene-1 and octene-1. Preferred butene-1 interpolymers would include ethylene, propylene, hexene-1, 4-methyl-pentene-1 and octene-1 as monomers.

The low density ethylene interpolymers may be used individually or in combination with each other in the compositions of the present invention.

Preferred low pressure, low density ethylene interpolymers for use in the present invention include those which may be produced in accordance with the procedures set forth in U.S. patent application Ser. No. 892,325 filed Mar. 31, 1975, and refiled as Ser. No. 014,414 on Feb. 27, 1979, in the names of F. J. Karol et al. and entitled "Preparation of Ethylene Copolymers in Fluid Bed Reactor", and the procedures set forth in U.S. patent application Ser. No. 892,322, filed Mar. 31, 1978, and refiled as Ser. No. 012,720 on Feb. 16, 1979, in the names of G. L. Goeke et al. and entitled "Impregnated Polymerization Catalyst, Process for Preparing, and Use for Ethylene Copolymerization" as well as procedures which will produce ethylene hydrocarbon copolymers with properties as heretofore described. U.S. application Ser. No. 014,414 corresponds to European patent application No. 79100953.3 which was opened to the public on Oct. 17, 1979 as Publication No. 4645 and U.S. application Ser. No. 012,720 corresponds to European patent application No. 79100958.2 which was opened to the public on Oct. 17, 1979 as Publication No. 4647. The disclosures of Publications Nos. 4645 and 4647 are incorporated herein by reference.

The more preferred low density ethylene interpolymers of the instant invention are those using supported chromium oxide based catalysts that are modified with titanium and, optionally, fluorine, as disclosed in U.S. Pat. Nos. 3,606,736 and 4,011,382 whose disclosures are included herein by reference.

These more prefered low density ethylene interpolymers are produced by copolymerizing ethylene with sufficient quantities of $C_3$ to $C_6$-olefin monomer to provide the desired density in the copolymer product in a fluid bed process at a temperature of from about 30° to 105° C. under a pressure of less than about 1000 psi. and under a mass gas flow rate of about 1.5 to 10 times $G_{mf}$ ($G_{mf}$ being the minimum gas flow rate necessary to sustain fluidization) by contacting the monomers with fluidized particles of a supported catalyst wherein said particles have an average diameter of about 50 to 200 microns said supported catalyst having been activated in air or oxygen at at temperature of about 300° to 900° C. and comprising, based on the total weight of the support and the catalyst, about 0.05 to 3.0 weight percent of chromium,
about 1.5 to 9.0 weight percent of titanium, and
0.0 to about 2.5 weight percent of fluorine, said chromium and said titanium being in the form of oxides after said activation.

The preferred catalyst composition comprises
about 0.2 to 1.0 weight percent of chromium,
about 4 to 7 weight percent of titanium, and
about 0.1 to about 1.0 weight percent of fluorine on a silica support.

CARBON BLACK CONCENTRATE

The carbon black concentrate of the instant invention is composed of carbon black and a low density alkylene interpolymer prepared via a low pressure process and hereinafter identified as the second low pressure, low density alkylene interpolymer.

The carbon black which may be used herein includes all reinforcing carbon blacks, including furnace blacks, acetylene blacks and channel blacks. The carbon black, should have a particle size of less than or equal to 100 millimicrons; preferably from about 15 to 40 millimicrons.

ANTIOXIDANT

The compositions of the present invention also advantageously contain one or more suitable high temperature antioxidants for the polymer systems.

The antioxidants are preferably stearically hindered phenols. Such compounds would include 4,4'-Thio bis(6-tert-butyl-m-cresol) Santonox (Monsanto Company)

Tetrakis methylene (3,5 di-tert-butyl-4-hydroxyhydrocinnamate) methane Irganox 1010 (Geigy Chemical Corporation)

Octadecyl 3-(3,5-di-tert butyl-4-hydrosphenyl) propionate Irganox 1076

Dinaphtyl-p-phenylene-diamine Agerite White (R. T. Vanderbilt Co., Inc.)

Dinaphtyl-p-phenylene-diamine DNPD (Pacific Anchor Chemical Corp.)

Diphenyl-p-phenylene-diamine DPPD (R. T. Vanderbilt Co., Inc.)

4,4'-thio-bis-(6-tert butyl-o-cresol) Ethyl 736 (Ethyl Corp.)

Tris nonylphenyl-phosphite Weston 399 (Borg Warner)

The antioxidants may be used individually, or in combination with one another.

The anti-oxidants are present in stabilizingly effective quantities. Such amounts are about 0.01 to 0.25 and preferably about 0.05 to 0.20 percent by weight based on the weight of the olefin polymer.

ADDITIVES

In addition to the high density ethylene polymer; the low density alkylene interpolymer; and the carbon black concentrate, the compositions of the present invention may also contain one or more additive materials of the types normally used in resin-based pipe or tubing compositions.

These other additives would include antioxidants; water-proofing fillers; inorganic fillers such as clay; talc; calcium carbonates; lubricants; stabilizers; and processing aids.

These additives would be used in amounts designed to provide their intended effect in the resulting composition. The total amount of such additives will range from 0 to about 10 weight percent based on the total weight of the composition.

All of the components of the compositions of the present invention are usually blended or compounded together prior to their introduction into the extrusion device from which they are to be extruded into the form of pipe or tubing. The ethylene polymer; alkylene interpolymer; carbon black concentrate of the composition; and the other desired constituents thereof, may be blended together by any of the techniques used in the art to blend and compound thermoplastics to homogeneous masses. For instance, the components may be fluxed on a variety of apparatus including multi-roll mills, screw mills, continuous mixers, compounding extruders and Banbury mixers, or dissolved in mutual or compatable solvents.

When all the solid components of the composition are available in the form of a powder, or as small particles, the compositions are most conveniently prepared by first making a blend of the high density and first low density components, e.g. in a Banbury mixer or a continuous extruder, and then masticating this blend on a heated mill, for instance on a two-roll mill, and the milling continued until an intimate blend of the components is obtained. Then the concentrate containing the carbon black and a second alkylene interpolymer and, in addition, if desired the antioxidant and/or other additives may, be added to the mass of the first two components.

Where the base polymers are not available in powder form, the compositions may be made by introducing the polymers to the mill, masticating until they form a band around one roll, after which the concentrate and, if desired, the remaining components are added and the milling continued until an intimate blend is obtained. The rolls are preferably maintained to the temperature which is within the range of 80° C. to 150° C. The composition, in the form of a sheet, is removed from the mill and then brought to a form, typically dice-like pieces, suitable for subsequent processing.

Alternately, all of the components can be added at the same time to a blender, such as a Banbury mixer or a continuous extruder, and pelletized.

After the various components of the compositions are uniformly blended together, they are further processed, in accordance with the present invention, in a conventional pipe or tubing extrusion apparatus at about 150° C. to 235° C.

The pipe or tubing is usually made with walls that are about 0.060 to 0.50 inches thick, and the inner diameter of the tubing may be of the order of 0.60 to 6.0 inches.

EXAMPLES

The following examples are merely illustrative of the present invention and are not intended as a limitation on the scope thereof.

HIGH DENSITY ETHYLENE POLYMER

The ethylene polymer used as the high density component of the base resin blend is an ethylene-propylene copolymer prepared in a slurry reaction as taught in U.S. Pat. No. 3,709,853 over a bis-(cyclopentadienyl) chromium II catalyst which was activated at 600° C. (catalyst: Ash 0.02-0.03%; productivity 3300 to 5000 pounds/pound of catalyst).

The polymer has a density of 0.950 grams per cubic centimeter; a melt index of 1.0 decigrams per minute; and a melt flow ratio (MFR) of 51.

LOW PRESSURE, LOW DENSITY ALKYLENE INTERPOLYMER

The low pressure, low density interpolymer used in these examples as the blend component for the high density ethylene polymer, i.e., the first low pressure, low density alkylene interpolymer; and as the carrier and dispersing agent for the carbon black in the concentrate, i.e., the second low pressure, low density alkylene interpolymer is an ethylene-butene-1 copolymer prepared according to U.S. Pat. No. 4,011,382.

The polymer has a density of 0.920 grams per cubic centimeter; a melt index of 0.76; a flow index of 55 (MFR:72); a melting point of 118° C.; and a crystallization point of 105.5° C.

This low pressure, low density resin is made by Union Carbide Corp. under the name G Resin 7510 (with Irganox 1010 additive (nominally 1,000 ppm)).

HIGH PRESSURE, LOW DENSITY ALKYLENE INTERPOLYMER

The high pressure, low density alkylene interpolymer is an ethylene homopolymer prepared at about 300° C. in a tubular reactor at from about 30,000 to 50,000 psi. The copolymer has a density of 0.921 grams per cubic centimeters and a melt index of 0.2 decigrams per minute.

This high pressure, low density ethylene homopolymer is made by Union Carbide under the name DFD 5600 Natural 7.

CARBON BLACK CONCENTRATES 64.80 weight percent of the high pressure, low density ethylene interpolymer is compounded at 260° C. using a Banbury pelletizing extruder with 35.0 weight percent Regal 99-I a trademark of Cabot Corp. for an amorphous carbon black solid with particle size less than or equal to 40 millimicrons and 0.20 weight percent Santonox "R", a trademark of Monsanto Chemical Co. for bis(2-methyl-4-hydroxy-5-t-butyl phenyl) sulfide. One half of the material is extruded through a 60 mesh screen pack (concentrate 1) and the other half through a 100 mesh screen pack (concentrate 2).

64.80 weight percent of the low pressure, low density ethylene-butene-1 interpolymer is compounded with 35 weight percent Regal 99-I and 0.20 weight percent Sanotonox "R" as above and one-half extruded through a 60 mesh screen pack (concentrate 3) and the other half through a 100 mesh screen pack (concentrate 4).

PIPE COMPOSITIONS

Each of the concentrate preparations is Banburied, milled, granulated and pelletized with 63.4 weight percent high density ethylene-propylene polymer; 30.0 weight percent low pressure, low density ethylene-butene-1 copolymer; and 0.1 weight percent Santonox "R", i.e., 6.5 weight percent concentrate as blended.

The four compositions have the properties as set forth in Table I with Example 1 containing concentrate 1; Example 2 containing concentrate 2; etc.

TABLE I

| Example No. | 1 | 2 | 3 | 4 |
|---|---|---|---|---|
| Physical Properties | | | | |
| Melt Index | 0.95 | 1.02 | 0.97 | 1.06 |
| Flow Index | 52.7 | 53.6 | 55.9 | 58.8 |
| Melt Flow Ratio | 55.5 | 52.5 | 57.6 | 55.5 |
| Density | 0.9533 | 0.9535 | 0.952 | 0.953 |
| ESCR (hrs.) 75 mil 0.012" slit 50° C. 100%/° Igepal | $F_0 > 504$ | $F_0 > 268$ | $F_0 > 504$ | $F_0 = 408$ |
| Slide Disperson | very good | very good | very good | very good |
| Low Temperature Brittleness | −57° C. | −57.5° C. | −67° C. | −67° C. |

TABLE I-continued

| Example No. | 1 | 2 | 3 | 4 |
|---|---|---|---|---|
| (notch) | | | | |

As can be seen from the data in Table I, the use of the low pressure, low density alkylene copolymer in the carbon black concentrate realizes a significant improvement in the notch low temperature brittleness of the medium density ethylene polymer pipe composition.

The compositions of Examples 1 through 4 were fed to a pipe extruder at a nominal rate of 74 pounds per hour under the following conditions:

| | | | |
|---|---|---|---|
| Die | 2" I.D. | Zone 1 (°F.) | 380 |
| Pin 1 | 1.652" O.D. | Zone 2 (°F.) | 390 |
| Snear Rate | 21.4 sec$^{-1}$ | Zone 3 (°F.) | 400 |
| Die Resistance Time | 5.88 sec | Head (°F.) | 400 |
| Sleeve Diameter | 1.235" | Die (°F.) | 400 |
| Amps | 10.9-11.0 | Stock (°F.) | 363 |
| Rpm | 45 | Head Pressure | 1053 |
| | In. Hg vacuum 6. | | |

The gloss values on the outside surface of all of the pipes prepared are good; however the inside, i.e., freely extruded surfaces of the pipes prepared from composition numbers 1 and 2—the compositions using the high pressure, low density resin carbon black concentrates—are only slightly glossly as compared to the inside surfaces of the pipes prepared from the composition numbers 3 and 4—the carbon black concentrates utilizing the low pressure, low density alkylene copolymer—which are fairly glossy i.e., a significant improvement is realized.

These visual observations are verified by roughness measurements which realize values of 35 and 30 micro inches for the inside surface measurements of pipes prepared from compositions 1 and 2 respectively, but only 25 and 24 for the inside surface measurements of pipes prepared from compositions 3 and 4 respectively. A noticeable improvement in smoothness is realized utilizing the concentrates of this invention.

The above compositions were subjected to the following tests:
Density: ASTM D 1505 Plaque is prepared under ASTM D 1928 Condition C.
Melt Index (M.I.): ASTM D 1238 Condition E
Flow Index (HLMI): ASTM D 1238 Condition F
Melt Flow Ratio (MFR): Flow Index÷Melt Index
ESCR: ASTM D 1693 Condition B
Gloss: Visual
Roughness:
 Bendix Profilometer (Micrometrical div.)
 Amplimeter (Model 4, Serial 2076)
 Tracer Head (Model 21 Serial 3200)
 Highest value of three tracings recorded.
Slide Dispersion: 0.001 in. concentrate film examined microscopically via transmitted light at 100 diam. magnification. Less than 25 millimicrons particles not resolved unless agglomerated.
Low Temp. Brittleness (notch): ASTM D 746 (modified) Specimen notched 0.020 in. at base of holder; perpendicular to thickness; and parallel to width. Only complete breaks are failures.

The low pressure, low density alkylene interpolymer of the concentrate, i.e., the second low pressure, low density alkylene interpolymer can be the same or different from the low pressure, low density alkylene interpolymer in the base blend, i.e., the first.

Thus, with medium density, thermoplastic, ethylene polymer pipe compositions, i.e., those with nominal density of from about 0.926 to 0.940 grams per cubic centimeter, that are blends of a high density ethylene polymer with a low pressure produced, low density alkylene interpolymer, carbon black concentrates comprising a low pressure, low density alkylene interpolymer when intimately blended realize compositions with significantly improved low temperature brittleness and pipes extruded from these compositions exhibit greatly enhanced freely extruded surfaces relative to those compositions and surfaces heretofore known in the art.

Obviously, other modifications and variations of the present invention are possible in light of the above teachings. It is, therefore, to be understood that changes may be made in the particular embodiments of this invention described which are within the full intended scope of the invention as defined by the appended claims.

What is claimed is:
1. A thermoplastic pipe forming composition having a nominal density of about 0.926 to 0.940 grams per cubic centimeter; and a melt index of about 0.1 to about 2.0 decigrams per minute,
 and comprising, based on the total weight of said composition, about 40 to about 80 parts by weight of high density ethylene polymer having
 a density of greater or equal to 0.941 to about 0.959 grams per cubic centimeter; and a melt index of about 0.1 to about 2.0 decigrams per minute, and
 about 10 to about 50 parts by weight of a first low pressure, low density alkylene interpolymer having
 a density of about 0.910 to 0.925 grams per cubic centimeter; and a melt index of about 0.1 to 2.0 decigrams per minute, and
 about 5.5 to about 9.5 parts by weight of a concentrate comprising, based on the total weight of said concentrate, about 25 to about 45 parts by weight of carbon black, and from about 55 to about 75 parts by weight of a second low pressure, low density alkylene interpolymer having
 a density of about 0.910 to 0.925 grams per cubic centimeter; and a melt index of about 0.1 to 2.0 decigrams per minute.
2. A composition as in claim 1 having a nominal density of about 0.935 to 0.940 grams per cubic centimeter, and a melt index of about 0.5 to 1.0 decigrams per minute.
3. A composition as in claim 1 which contains about 55 to about 70 parts by weight of the high density ethylene polymer.
4. A composition as in claim 1 which contains about 20 to about 40 parts by weight of said first low pressure, low density alkylene interpolymer.
5. A composition as in claim 1 which contains stabilizingly effective quantities of antioxidant.
6. A composition as in claim 5 which contains about 0.01 to about 0.25 weight percent based on the total composition weight of said antioxidant.
7. A composition as in claim 1 wherein the high density ethylene polymer has a density of about 0.948 to 0.952 grams per cubic centimeter.
8. A composition as in claim 7 wherein the high density ethylene polymer has a melt index of about 0.7 to 1.3 decigrams per minute.

9. A composition as in claim 1 wherein said first low pressure, low density alkylene interpolymer has a density of about 0.918 to 0.923 grams per cubic centimeter.

10. A composition as in claim 1 wherein said second low pressure, low density alkylene interpolymer has a density of about 0.918 to 0.923 grams per cubic centimeter.

11. A composition as in claim 9 wherein said first low pressure, low density alkylene interpolymer has a melt index of about 0.5 to 0.9 decigrams per minute.

12. A composition as in claim 10 wherein said second low pressure, low density alkylene interpolymer has a melt index of about 0.5 to 0.9 decigrams per minute.

13. A composition as in claim 1 wherein the high density ethylene polymer is an ethylene-propylene copolymer.

14. A composition as in claim 1 wherein said first low pressure, low density alkylene interpolymer is an ethylene-butene-1 copolymer.

15. A composition as in claim 1 wherein said second low pressure, low density alkylene interpolymer is an ethylene-butene-1 copolymer.

16. A composition as in claim 1 wherein said concentrate contains from about 30 to about 40 parts by weight carbon black based on the total weight of said concentrate.

17. Pipe having improved freely extruded surface smoothness and gloss formed from the thermoplastic ethylene polymer based composition of claim 1.

18. A composition as in claim 1 wherein the second low pressure, low density alkylene interpolymer is a product produced by a fluid bed process utilizing a catalyst comprising activated chromium and titanium.

19. A composition as in claim 18 wherein said catalyst comprises activated chromium, titanium and fluorine.

20. A composition as in claim 1 wherein the second low pressure low density alkylene interpolymer is a product produced by copolymerizing ethylene with sufficient quantities of $C_3$ to $C_6$-olefin monomer to provide the desired density in the copolymer product in a fluid bed process at a temperature of about 30° to 105° C., under a pressure of less than about 1000 psi. and under a mass gas flow rate of about 1.5 to 10 times $G_{mf}$ by contacting the monomers with fluidized particles of a supported catalyst wherein said particles have an average diameter of about 50 to 200 microns said supported catalyst having been activated in air or oxygen at a temperature of about 300° to 900° C., and comprising, based on the total weight of the support and the catalyst, about 0.05 to 3.0 weight percent of chromium, about 1.5 to 9.0 weight percent of titanium, and 0.0 to about 2.5 weight percent of fluorine, said chromium and said titanium being in the form of oxides after said activation.

21. A composition as in claim 20 in which said catalyst comprises about 0.2 to 1.0 weight percent of chromium;
about 4 to 7 weight percent of titanium; and
about 0.1 to 1.0 weight percent of fluorine.

22. A composition as in claim 21 in which said support comprises silica.

* * * * *